US012366830B2

(12) United States Patent
Maruyama

(10) Patent No.: US 12,366,830 B2
(45) Date of Patent: Jul. 22, 2025

(54) CASE AND TIMEPIECE

(71) Applicant: CASIO COMPUTER CO., LTD., Tokyo (JP)

(72) Inventor: Yoshihiro Maruyama, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 540 days.

(21) Appl. No.: 17/835,539

(22) Filed: Jun. 8, 2022

(65) Prior Publication Data

US 2022/0299943 A1 Sep. 22, 2022

Related U.S. Application Data

(63) Continuation of application No. 16/574,186, filed on Sep. 18, 2019, now Pat. No. 11,460,813.

(30) Foreign Application Priority Data

Oct. 4, 2018 (JP) ................................ 2018-188764

(51) Int. Cl.
*G04B 37/22* (2006.01)
*G04B 37/08* (2006.01)

(52) U.S. Cl.
CPC ............. *G04B 37/22* (2013.01); *G04B 37/08* (2013.01)

(58) Field of Classification Search
CPC ...... G04B 37/084; G04B 37/22; G04B 37/08; G04B 37/05; G04B 37/04; G04B 37/0058; G04D 3/00

(Continued)

(56) References Cited

U.S. PATENT DOCUMENTS 11,181,866 B2 11/2021 Maruyama et al.
2007/0194086 A1 8/2007 Yuura (Continued)

FOREIGN PATENT DOCUMENTS

JP S57-108688 A 7/1982
JP H06-238473 A 8/1994

(Continued)

OTHER PUBLICATIONS

Office Action dated Nov. 23, 2021 received in U.S. Appl. No. 16/574,186.

(Continued)

*Primary Examiner* — Edwin A. Leon
(74) *Attorney, Agent, or Firm* — SCULLY SCOTT MURPHY & PRESSER, PC

(57) ABSTRACT

A case includes a main case body and an exterior member. The exterior member is welded to the main case body with laser light. The laser light is irradiated onto a welding part of the main case body and the exterior member and reflected at an irradiation surface, and a reflected-light receiving part is formed at a position where the reflected laser light is irradiated according to an incidence angle of the laser light to the irradiation surface. The exterior member includes a flange part which is disposed on an upper side of the main case body and which protrudes toward an inner side of the main case body. A lower surface of the flange part includes a module receiving surface which receives a module to be disposed inside the main case body, and the reflected-light receiving part is formed at a part of the module receiving surface.

22 Claims, 4 Drawing Sheets

(58) Field of Classification Search
USPC .......................................................... 368/291
See application file for complete search history.

(56) References Cited

U.S. PATENT DOCUMENTS

| | | | | |
|---|---|---|---|---|
| 2016/0054707 | A1 | 2/2016 | Kraehenbuehl et al. | |
| 2016/0370763 | A1* | 12/2016 | Cusin | G04B 17/34 |
| 2017/0139376 | A1 | 5/2017 | Bazin | |
| 2018/0104771 | A1* | 4/2018 | Cusin | B23K 26/21 |

FOREIGN PATENT DOCUMENTS

| | | | |
|---|---|---|---|
| JP | 2007-223063 | A | 9/2007 |
| JP | 2015-121412 | A | 7/2015 |
| JP | 2016081830 | A | 5/2016 |

OTHER PUBLICATIONS

Notice of Allowance dated Mar. 7, 2022 received in U.S. Appl. No. 16/574,186.
Notice of Reasons for Refusal dated Aug. 2, 2022 received in Japanese Patent Application No. JP 2020-184046.

* cited by examiner

CASE AND TIMEPIECE

CROSS-REFERENCE TO RELATED APPLICATIONS

This application is a continuation application of U.S. patent application Ser. No. 16/574,186 filed on Sep. 18, 2019, which is based upon and claims the benefit of priority from prior Japanese patent application No. 2018-188764, filed on Oct. 4, 2018, the entire contents of which are incorporated herein by reference.

BACKGROUND

Technical Field

The technical field relates to a case and a timepiece.

Description of the Related Art

In the related art, there is a method of forming a case for a timepiece or the like by integrally joining a main case body and exterior members such as a bezel.

For example, in JP-A-2015-121412 discloses an example in which a case for a timepiece is configured by integrating exterior members with a main case body by caulking.

By forming a case for a timepiece or the like by joining a plurality of members as described above, it is possible to realize a more complicated device more superior in design, such as a timepiece.

As a method of joining a plurality of members, besides caulking, screwing, laser welding, and so on can be used.

Especially, in the case of joining a plurality of members from the inner side by laser welding, the external appearance is not affected, and it is unnecessary to separately prepare members such as screws. Therefore, a small number of components is required, and it is possible to make the entire case thinner and smaller.

However, in the case of trying to weld small members like a main case body and an exterior member for a timepiece or the like from the inner side of the case, constraints are placed on the irradiation position and angle of laser light, and sometimes, it is required to irradiate a welding part at a slant with laser light.

In this case, from the welding part irradiated with the laser light, the laser light is reflected, and a part on which the reflected light has arrived might be melt.

For example, if the inside of the case for a timepiece or the like is melted, whereby the surface gets rough, in the case of storing members inside the case, it is impossible to exactly position them, or they jounce.

SUMMARY

According to one aspect of the disclosure, a case includes a main case body and an exterior member. The exterior member is welded to the main case body with laser light. The laser light is irradiated onto a welding part of the main case body and the exterior member and reflected at an irradiation surface, and a reflected-light receiving part is formed at a position where the reflected laser light is irradiated according to an incidence angle of the laser light to the irradiation surface. The exterior member includes a flange part which is disposed on an upper side of the main case body and which protrudes toward an inner side of the main case body. A lower surface of the flange part includes a module receiving surface which receives a module to be disposed inside the main case body, and the reflected-light receiving part is formed at a part of the module receiving surface.

DETAILED DESCRIPTION

With reference to FIG. 1 to FIG. 3A and FIG. 3B, a first embodiment of a case and a timepiece having the case will be described. Also, in the present embodiment, the case where a case is applied to a timepiece which can be worn on a wrist (a wristwatch) will be described as an example.

Figure 1:
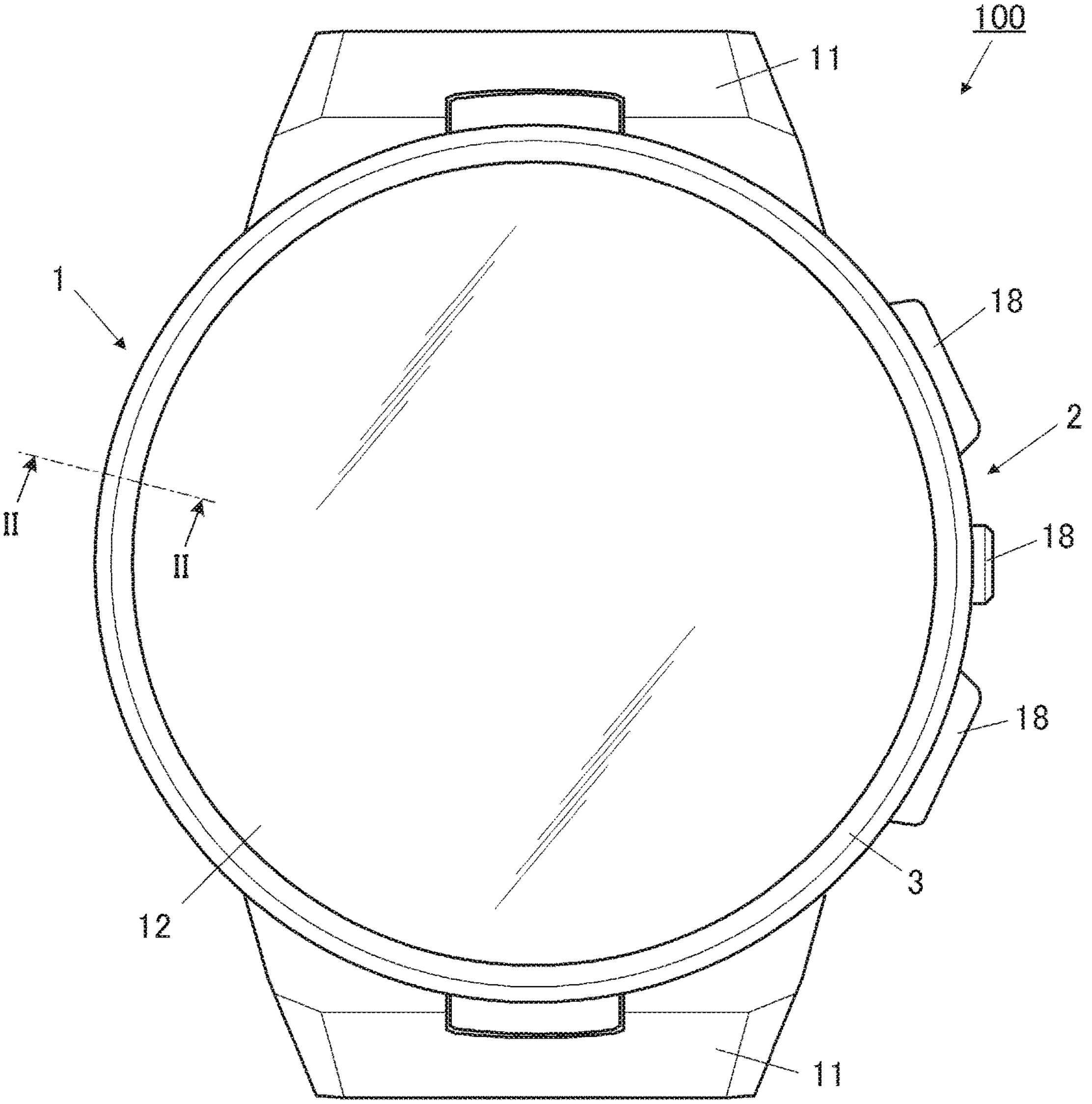
FIG. 1 is a front view of a timepiece of an embodiment.
Figure 2A:
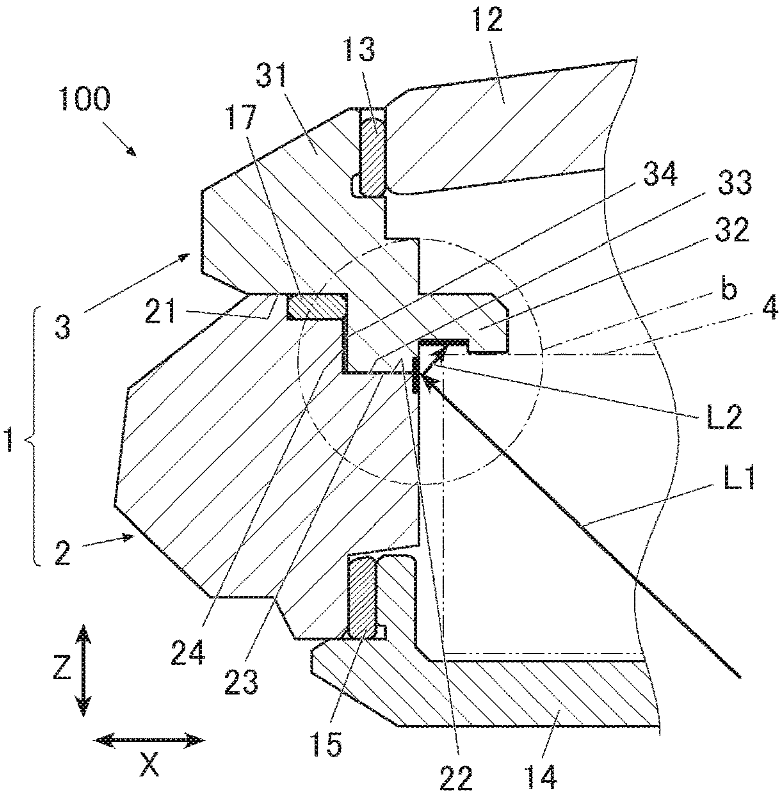
FIG. 2A is a cross-sectional view of a main part along a line II-II shown in FIG. 1.
Figure 2B:
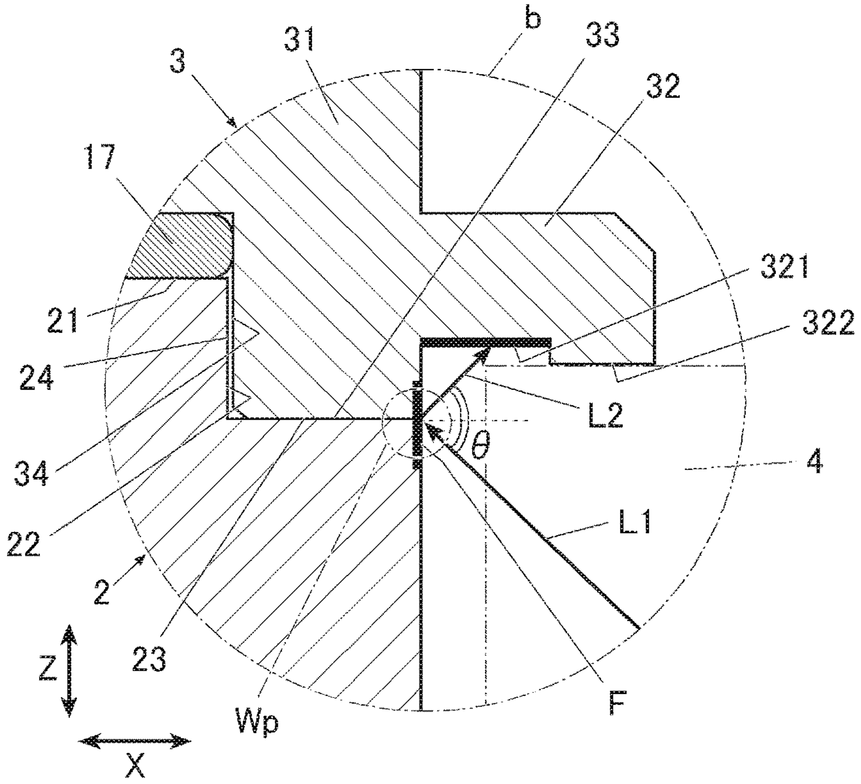
FIG. 2B is an enlarged view of Part “b” surrounded by a dash-dot line in FIG. 2A.

FIG. 1 is a front view of a timepiece (a wristwatch) according to the present embodiment, and FIG. 2A is a cross-sectional view of a main part along a line II-II shown in FIG. 1, and FIG. 2B is an enlarged view of Part “b” surrounded by a dash-dot line in FIG. 2A.

A timepiece 100 according to the present embodiment is, for example, an analog type timepiece which displays time by rotating hands (a second hand, a minute hand, and an hour hand) not shown in the drawings. However, in FIG. 1, the hands, a dial having them, and so on are not shown. Further, the timepiece is not limited to an analog type timepiece. For example, the timepiece may be a digital type timepiece having a liquid crystal display unit and so on, or may be a timepiece having a display unit having both of an analog system and a digital system.

As shown in FIG. 1, FIG. 2A, and FIG. 2B, the timepiece 100 has a case 1 which includes a main case body 2 and an exterior member 3.

The exterior member 3 is a member which is disposed on the upper side of the main case body 2 (the upper side in FIG. 2A, i.e. the viewable side), and is, for example, a bezel, a decorative ring, or the like.

As will be described below, the main case body 2 and the exterior member 3 are made so as to be able to be integrated by laser welding, thereby forming the case 1. Also, parts colored with heavy black lines in FIG. 2A, FIG. 2B, and so on, are parts which are melted during laser welding.

The case 1 is formed in a short hollow cylinder shape, and have openings at the top and the bottom in the thickness direction of the timepiece 100.

Also, although the case where the shape of the timepiece 100 as seen from the viewable side is almost circular as seen in a plan view and the case 1 is formed in an almost cylindrical shape is given as an example in the present embodiment, the shape of the timepiece 100 is not limited to the example shown in the drawings. For example, the shape of the timepiece as seen from the viewable side may be an elliptical shape, a rectangular shape, or the like as seen in a plan view.

On the front side of the case 1, a windshield member 12 made of a transparent member such as glass is provided so as to cover the opening part. The windshield member 12 is mounted on the exterior member 3 with a waterproof ring 13 interposed therebetween, so as to block the opening part on the front side such that airtightness is ensured.

Also, on the lower side of the case 1 (the lower side in a Z direction in FIG. 2A, i.e. the rear side of the timepiece 100), a back lid member 14 is provided. The back lid member 14 is mounted on the main case body 2 with a waterproof ring 15 interposed therebetween, so as to block the opening part on the rear side such that airtightness is ensured. However, the case 1 and the back lid member 14 may be integrally molded so as not to have an opening part on the lower side of the case 1.

Inside the case 1, a module 4 (see FIG. 2A, FIG. 2B, and so on) having, for example, a motor to serve as a drive source for operating the hands, a gear mechanism, and so on is stored.

As shown in FIG. 1, parts of the lateral surface of the case 1 corresponding to the 12 o'clock position and 6 o'clock position of the timepiece (i.e. the upper and lower end parts in FIG. 1) have band attaching parts 11 which a timepiece band (not shown in the drawings) can be attached to.

Also, the timepiece 100 has operation buttons 18 on the side part and the like of the case 1. The operation buttons 18 are, for example, push buttons, crowns, and so on. The operation buttons 18 are configured such that the insertion-side end parts of the operation buttons 18 are connected to the module 4 stored in the case 1 and various operations are possible by pushing or rotating the operation buttons 18.

The main case body 2 of the present embodiment is short and is almost cylindrical, and the upper side of the main case body 2 has a stair part 22 formed such that an end surface 23 on the inner periphery side is lower than an end surface 21 on the outer periphery side by one step as shown in FIG. 2A, FIG. 2B, and so on.

The end surface 23 on the inner periphery side which constitutes the bottom of the stair part 22 is almost parallel with the thickness direction X of the main case body 2 (see FIG. 2A, FIG. 2B, and so on).

Also, an inner periphery surface 24 of the stair part 22 is an almost vertical surface extending along the height direction Z of the timepiece 100 (see FIG. 2A, FIG. 2B, and so on) which is a direction perpendicular to the thickness direction X of the main case body 2.

The exterior member 3 of the present embodiment is an almost annular member, and has a main body part 31, and an inward flange part 32 extending from the inner periphery surface of the main body part 31 toward the inner side of the main case body 2.

As shown in FIG. 2A and so on, a part of the outer periphery side of the exterior member 3 positioned on the lower side of the main body part 31 is disposed on the end surface 21 of the outer periphery side of the main case body 2 with a waterproof ring 17 interposed therebetween.

Also, the inner periphery side of the main body part 31 positioned on the lower side is formed so as to have a length in the height direction Z of the timepiece 100 longer than that of the outer periphery side, and is disposed inside the stair part 22 of the main case body 2.

In this case, a lower end surface 33 of the main body part 31 of the exterior member 3 facing the end surface 23 of the inner periphery side of the main case body 2 is a surface almost parallel with the thickness direction X of the main case body 2, similarly to the end surface 23 of the inner periphery side of the main case body 2. Also, an outer periphery surface 34 of the main body part 31 of the exterior member 3 facing the inner periphery surface 24 of the main case body 2 is an almost vertical surface extending along the height direction Z of the timepiece 100, similarly to the inner periphery surface 24 of the main case body 2.

As shown in FIG. 2B, at a position on the lower surface of the inward flange part 32 on which the reflected light L2 of the laser light L1, which is radiated toward a welding part Wp of the main case body 2 and the exterior member 3, from an irradiation surface F arrives corresponding to the incidence angle θ of the laser light to the irradiation surface F, a reflected-light receiving part 321 for preventing spreading of melting from being caused by the reflected light L2 is formed.

Also, the part of the lower surface of the inward flange part 32 without the reflected-light receiving part 321 (in the present embodiment, the part of the inner periphery side of the exterior member 3) constitutes a module receiving surface 322 for receiving the module 4 to be disposed inside the case 1.

For purposes such as improving the accuracy of positioning of the module 4, the module 4 needs to be received by a surface which is as stable as possible (a surface having high surface accuracy) and does not jounce. Therefore, it is preferable that the surface of the module receiving surface 322 be as flat as possible.

Figure 3A:
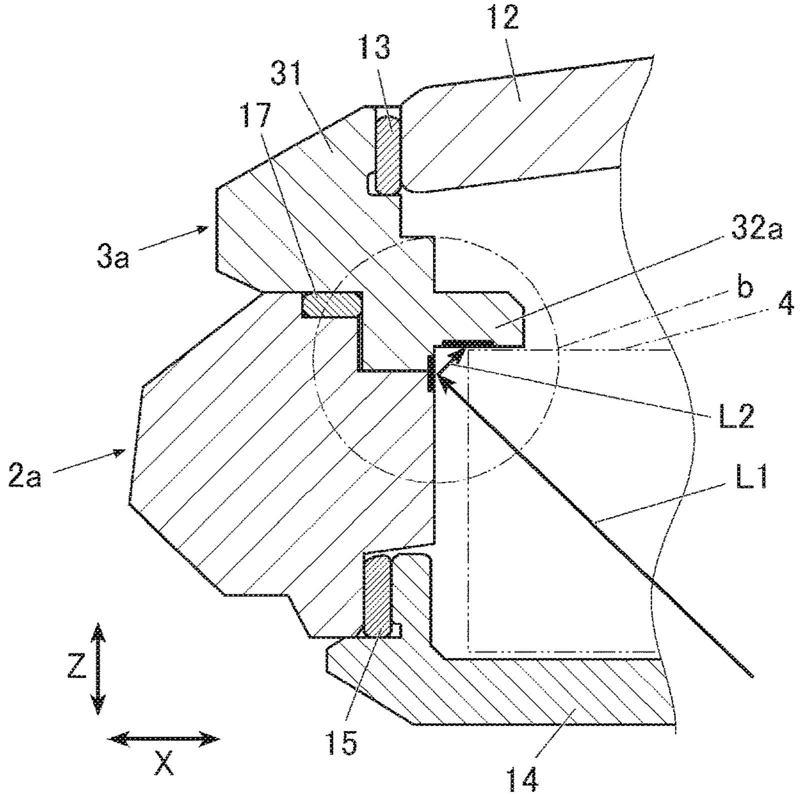
FIG. 3A is a cross-sectional view of a main part of a configuration of the related art in the case where laser welding of a main case body and an exterior member has been performed.
Figure 3B:
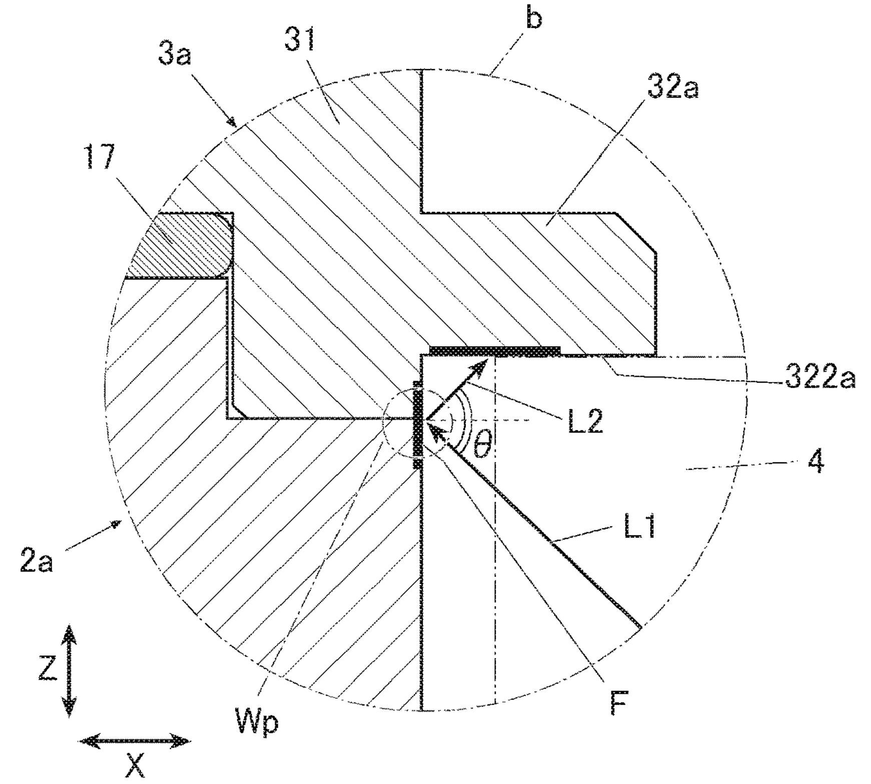
FIG. 3B is an enlarged view of Part “b” surrounded by a dash-dot line in FIG. 3A.

FIG. 3A and FIG. 3B are views illustrating the case of welding a main case body 2*a* and an exterior member 3*a* when the reflected-light receiving part 321 is not provided in the lower surface of an inward flange part 32*a*.

If the lower surface of the inward flange part 32*a* is melted by the reflected light L2, the surface gets rough, and irregularities of about 1 mm are formed.

In this case, if the arrival position of the reflected light L2 and a module receiving surface 322*a* are flush with each other and are connected, the influence of the reflected light L2 spreads to the lower surface of the inward flange part 32*a*, and as shown in FIG. 3B, even the surface of the module receiving surface 322*a* for receiving the module 4 melts and gets rough.

For this point, if the reflected-light receiving part 321 which is not flush with the module receiving surface 322 is provided at the arrival position of the reflected light L2 like in the present embodiment, the influence of the reflected light L2 is regulated within the reflected-light receiving part 321, so it is possible to prevent the surface of the module receiving surface 322 from melting and getting rough. Also, since scorch, soot, and the like attributable to the reflected light L2 do not adhere to the inner side of the case 1, it is possible to prevent the inside of the case 1 from being contaminated.

For example, in the case where the incidence angle θ of the laser light L1 to the irradiation surface F is 45 degrees, the output angle of the reflected light L2 from the irradiation surface F also is 45 degrees. For this reason, as shown in FIG. 2B, the reflected-light receiving part 321 is provided at the position on which the reflected light L2 arrives.

By the way, in laser welding, in the case of irradiating the irradiation surface F with the laser light L1 at an angle as close to a right angle as possible, it is possible to efficiently perform sufficient welding (adhesion). However, as the incidence angle θ decreases, the arrival position of the reflected light L2 shifts toward the inner periphery side of the inward flange part 32 (toward the center side of the case 1). Therefore, it is difficult to ensure the module receiving surface 322, and it is impossible to dispose the module 4 in the vicinity of the inner periphery surface of the case 1.

For this reason, the incidence angle θ of the laser light L1 to the irradiation surface F, the arrangement of the reflected-light receiving part 321, and the like are appropriately determined in view of the balance of the adhesivity of the main case body 2 and the exterior member 3 and ensuring of the module receiving surface 322.

In the present embodiment, the reflected-light receiving part 321 is a recess part formed in the lower surface of the inward flange part 32.

The reflected-light receiving part 321 is formed so as to be enough for receiving the reflected light and preventing spreading of melting to a part other than the reflected-light receiving part 321 and be able to sufficiently ensure the module receiving surface 322. To this end, in the present embodiment, over a part of the lower surface of the in the inward flange part 32 with about half of the width from the outer periphery side (for example, if the protruding width of the inward flange part 32 is about 1 mm, about 0.5 mm), the reflected-light receiving part 321 is formed. Also, it is preferable that the depth of the inward flange part 32 be about 0.1 mm to 0.2 mm considering that irregularities which can be formed during irradiation with the reflected light L2 are about 0.1 mm.

However, the shape, size, and so on of the reflected-light receiving part 321 are not particularly limited. For example, the reflected-light receiving part 321 may not have a recess shape and may be a stair part formed so as to have a step such that the reflected-light receiving part is not flush with the module receiving surface 322. Alternatively, the reflected-light receiving part 321 may have a configuration suppressing the influence of the reflected light L2 on the surroundings, for example, by attaching a material for absorbing the reflected light L2.

In the present embodiment, the contact surface of the main case body 2 and the exterior member 3 includes a first abutting surface parallel with the thickness direction X of the main case body 2 and a second abutting surface perpendicular to the thickness direction X of the main case body 2, and in the present embodiment, the end surface 23 of the inner periphery side of the main case body 2 and the lower end surface 33 of the exterior member 3 constitute one abutting surface (the first abutting surface), and the inner periphery surface 24 of the main case body 2 and the outer periphery surface 34 of the exterior member 3 constitute the other abutting surface (the second abutting surface).

Like this, the end surface 23 of the inner periphery side of the main case body 2 and the lower end surface 33 of the exterior member 3 constituting the first abutting surface parallel with the thickness direction X of the main case body 2 come into contact. Therefore, the main case body 2 and the exterior member 3 are positioned such that misalignment in the height direction Z of the timepiece 100 does not occur.

In the present embodiment, the main case body 2 and the exterior member 3 which constitute the case 1 are made of metal materials such as SUS (Steel Special Use Stainless), titanium, and the like.

As described above, the exterior member 3 needs to be welded to the main case body 2 with a laser. Therefore, in terms of adhesivity, it is preferable that the main case body 2 and the exterior member 3 be made of the same material (for example, if the main case body 2 is made of titanium, it is preferable to make the exterior member 3 of titanium, and if the main case body 2 is made of SUS, it is preferable to make the exterior member 3 of SUS).

However, the main case body 2 and the exterior member 3 are not limited to those made of the same material, and may be made of different materials as long as the materials can be welded with a laser (for example, it is possible to make the main case body 2 of titanium and make the exterior member 3 of tungsten).

Now, the action of the case 1 and the timepiece 100 having the case 1 according to the present embodiment will be described.

When the timepiece 100 is assembled, first, the exterior member 3 is placed on the upper side of the main case body 2 with the waterproof ring 17 interposed therebetween.

At this time, the main case body 2 and the exterior member 3 come into contact at the first abutting surface parallel with the thickness direction X of the main case body 2 (the end surface 23 of the inner periphery side of the main case body 2 and the lower end surface 33 of the exterior member 3). As a result, the main case body 2 and the exterior member 3 are positioned such that misalignment in the height direction Z of the timepiece 100 does not occur.

Next, as shown in FIG. 2A and FIG. 2B, the welding part Wp of the main case body 2 and the exterior member 3 is welded from the rear side of the case 1 with laser light. Specifically, the laser light L1 is radiated from the vicinity of the center part (the center of the annular shape) of the rear side of the main case body 2 toward the part which is a surface to be the inner periphery surface of the case 1 and at which the main case body 2 and the exterior member 3 need to be welded (the welding part Wp). As a result, a part of the welding part Wp melts and the main case body 2 and the exterior member 3 adhere to each other.

At this time, the reflected light L2 from the irradiation surface F of the welding part Wp is radiated toward the lower surface of the inward flange part 32 at the angle according to the incidence angle θ of the laser light L1.

The reflected light L2 arrives the reflected-light receiving part 321 formed in the lower surface of the inward flange part 32, and melts the inside of the reflected-light receiving part 321 but does not go beyond the step of the reflected-light receiving part 321 having a recess shape. Therefore, the influence of the reflected light L2 is exerted on only the inside of the reflected-light receiving part 321, and spreading of melting to the module receiving surface 322 is prevented. As a result, the module receiving surface 322 is maintained as a surface which has high surface accuracy and is free from the influence of the reflected light L2.

Further, the module 4 is disposed from the rear side of the case 1.

At this time, the upper surface of the module 4 is brought into contact with the module receiving surface 322.

Since the module receiving surface 322 is not melted by the reflected light L2, and the surface is maintained in the flat state without roughness, the module 4 is precisely positioned so as not to jounce.

If necessary components such as the module 4 are assembled and stored inside the case 1, the back lid member 14 is attached to the opening part of the rear side of the case 1 with the waterproof ring 15 interposed therebetween, so as to block the opening part of the rear side.

Also, the windshield member 12 is attached to the opening part of the front side (the viewable side) of the case 1 with the waterproof ring 3 interposed therebetween, so as to block the opening part of the front side (the viewable side).

Then, assembling of the timepiece 100 having the case 1 is completed.

As described above, in the case of forming the case 1 by integrating the main case body 2 and the exterior member 3 by laser welding, the laser light L1 is radiated toward the welding part Wp of the main case body 2 and the exterior member 3. According to the present embodiment, at the position on which the reflected light L2 from the irradiation surface F arrives corresponding to the incidence angle θ of the laser light to the irradiation surface F, the reflected-light receiving part 321 for preventing spreading of melting from being caused by the reflected light L2 is formed.

Therefore, it is possible to regulate the part which is melted by the reflected light L2 within the reflected-light receiving part 321, and it is possible to prevent the influence of the reflected light L2 from being exerted on parts required to have flat surfaces, such as the module receiving surface 322.

Therefore, it is possible to precisely position the module 4 on the flat module receiving surface 322 which is a surface having high surface accuracy so as not to jounce, and assembling in the case 1 with high accuracy is possible.

Also, the exterior member 3 of the present embodiment has the inward flange part 32 which is placed on the upper side of the main case body 2 so as to extend toward the inner side of the main case body 2, and the reflected-light receiving part 321 is formed in the lower surface of the inward flange part 32, and the part of the lower surface of the inward flange part 32 without the reflected-light receiving part 321 constitutes the module receiving surface 322 for receiving the module 4 to be placed inside the main case body 2.

Therefore, even in the case where the reflected light L2 is radiated toward the lower surface of the inward flange part 32 constituting the module receiving surface 322, the part which is melted by the reflected light L2 is regulated within the reflected-light receiving part 321, whereby it is possible to prevent the influence of the reflected light L2 from being exerted on other parts required to have flat surfaces, such as the module receiving surface 322.

Therefore, it is possible to precisely position the module 4 on the flat module receiving surface 322 so as not to jounce, and assembling in the case 1 with high accuracy is possible.

Also, in the present embodiment, the contact surface of the main case body 2 and the exterior member 3 includes the end surface 23 of the inner periphery side and the lower end surface 33 constituting the first abutting surface parallel with the thickness direction X of the main case body 2, and the inner periphery surface 24 and the outer periphery surface 34 constituting the second abutting surface perpendicular to the thickness direction X of the main case body 2.

Like this, the main case body 2 and the exterior member 3 come into contact at the end surface 23 of the inner periphery side and the lower end surface 33 constituting the first abutting surface parallel with the thickness direction X of the main case body 2. As a result, the position of the exterior member 3 relative to the main case body 2 in the height (thickness) direction Z of the timepiece 100 is surely defined, and it is possible to form the case 1 without unevenness in the height (thickness) direction Z of the timepiece 100.

Also, in the present embodiment, the waterproof ring 17 to be interposed between the main case body 2 and the exterior member 3 is further provided.

Therefore, it is possible to ensure airtightness between the main case body 2 and the exterior member 3 not only by adhesion of the main case body 2 and the exterior member 3 but also the waterproof ring 17, and it is possible to realize the case 1 having high reliability in airtightness.

The case 1 of the timepiece 100 has the operation buttons 18 such as push buttons, crowns, and the like on the side and the like. Since one-side ends of the operation buttons 18 are inserted into the case 1, in some assembly procedures and so on, the insertion-side shaft parts, pipe members, and the like of the operation buttons 18 may hinder radiation of the laser light L1 onto the welding part Wp. In this case, it is difficult to weld the main case body 2 and the exterior member 3 without discontinuity over the entire periphery of the case 1. For this reason, the waterproof ring 17 is provided between the main case body 2 and the exterior member 3. In this case, even if welding is performed in such a manner to avoid the parts where there are the operation buttons 18 and the like, it is possible to surely ensure airtightness between the main case body 2 and the exterior member 3.

Also, even in the case where it is possible to perform laser welding in a state where the operation buttons 18 do not exist, if the waterproof ring 17 is provided in addition to ensuring of airtightness by adhesion, it is possible to further improve reliability in airtightness.

Also, in the case where the timepiece 100 is configured to have the case 1 and the module 4 stored in the module 4, if the main case body 2 and the exterior member 3 are welded by laser light, since members such as screws are not used, it is possible to make the case 1 thin and light.

Therefore, it is possible to realize the timepiece 100 having the case 1 having excellent design, with no constraint on design.

Also, even in the case of forming the case 1 by laser welding, it is possible to precisely position the module 4 on the module receiving surface 322 maintained flat.

Therefore, it is possible to make the timepiece 100 having high accuracy and excellent in the efficiency of assembling.

Although the embodiment of the present invention has been described above, it goes not without saying that the present invention is not limited to the embodiment, and various modifications are possible without departing from the gist of the present invention.

For example, in the present embodiment, the example in which the inner periphery surface of the main case body 2 in the welding part Wp and the inner periphery surface of the exterior member 3 in the welding part Wp are almost flush with each other as shown in FIGS. 2A and 2B has been described. However, the configuration of the welding part Wp of the main case body 2 and the exterior member 3 is not limited thereto.

Figure 4A:
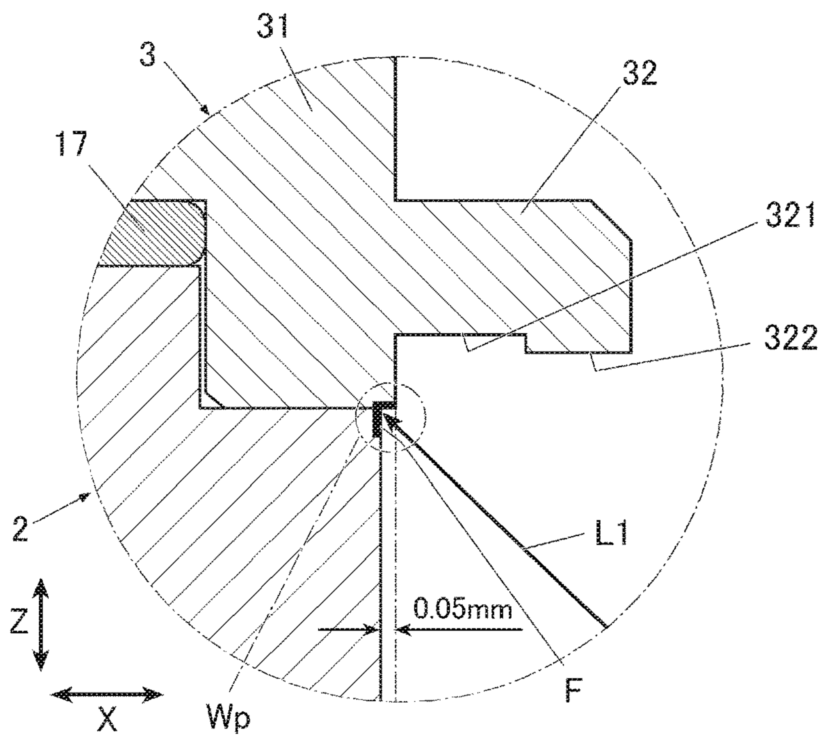
FIG. 4A is a cross-sectional view of a main part of a modification of the embodiment.

For example, as shown in FIG. 4A, in the welding part Wp, the exterior member 3 may project inward from the main case body 2. In this case, specifically, the inside diameter of the exterior member 3 in the welding part Wp is set so as to be smaller than the inside diameter of the main case body 2 in the welding part Wp such that the inner periphery surface of the exterior member 3 in the welding part Wp protrudes slightly toward the inner side of the case 1 from the inner periphery surface of the main case body 2 in the welding part Wp.

FIG. 4A shows an example in which the inner periphery surface of the exterior member 3 in the welding part Wp has been formed so as to protrude toward the inner side of the case 1 from the inner periphery surface of the main case body 2 in the welding part Wp by 0.05 mm.

How much the inside diameter of the exterior member 3 in the welding part Wp is set to be smaller than the inside diameter of the main case body 2 in the welding part Wp needs only to be appropriately set. By the way, in general, the error allowable between components is about 0.05 mm, and if the tolerance for components is added thereto, it is about 0.075 mm. Therefore, it is preferable to set the difference in inside diameter to about 0.05 mm to 0.075 mm.

Figure 4B:
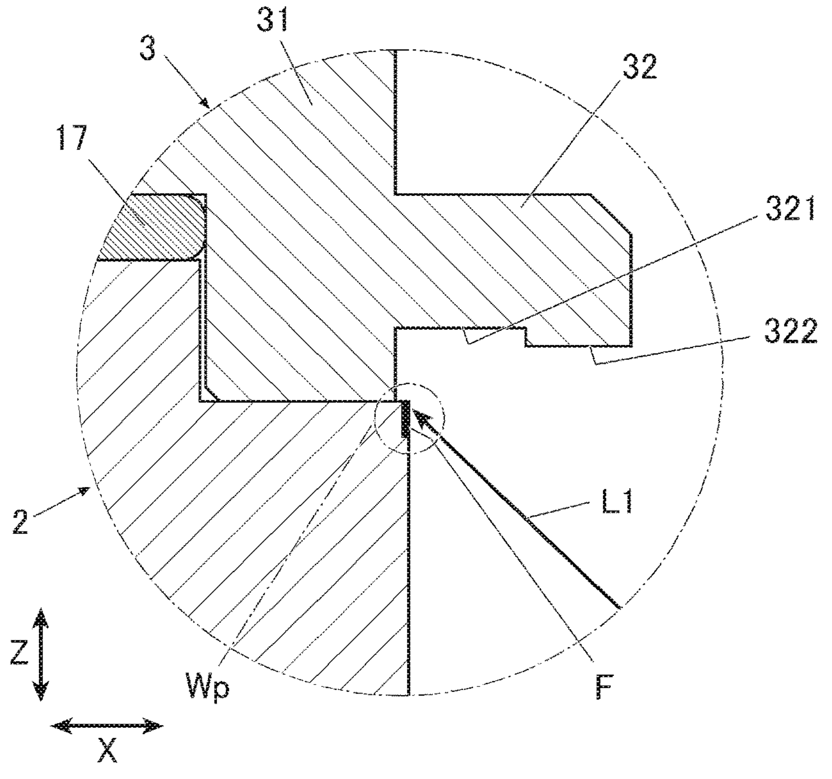
FIG. 4B is a cross-sectional view of a main part of an example of a case where a configuration contrary to that shown in FIG. 4A has been taken.

In the case of welding the welding part Wp of the main case body 2 and the exterior member 3 from the rear side of the case 1 with laser light like in the present embodiment, if the inner periphery surface of the main case body 2 in the welding part Wp protrudes inward from the inner periphery surface of the exterior member 3 in the welding part Wp, as shown in FIG. 4B, in the welding part Wp, the inner periphery surface of the main case body 2 is irradiated with the laser light L1, but the inner periphery surface of the exterior member 3 is not sufficiently irradiated with the laser light L1 since it is overshadowed by the protruding part of the main case body 2. For this reason, the part of the welding part Wp which is a part of the exterior member 3 does not melt much, so the main case body 2 and the exterior member 3 may not sufficiently adhere to each other.

For this point, in the case of forming the inner periphery surface of the exterior member 3 in the welding part Wp so as to protrude toward the inner side of the case 1 from the inner periphery surface of the main case body 2 in the welding part Wp as shown in FIG. 4A, it is possible to prevent a situation in which a part which is not irradiated with the laser light L1 occurs in the welding part Wp, and it is possible to make the main case body 2 and the exterior member 3 sufficiently adhere to each other.

Also, although the case where the case 1 is the case of the timepiece 100 has been described as an example in the present embodiment, the case 1 is not limited to the case where it is applied to a timepiece.

For example, the case 1 may be a case applicable to various devices which hold mechanical components and so on which need to be precisely positioned on flat surfaces inside cases, such as pedometers, heart rate measuring devices, altimeters, and barometers.

Although some embodiments of the present invention have been described above, the scope of the present invention is not limited to the above-described embodiments, and includes combinations of elements of the embodiments, and scopes equivalent to the scopes of the inventions disclosed in claims.

What is claimed is:

1. A case comprising:

a first member having a first surface; and a second member having a second surface and a third surface inclined at a prescribed angle to the second surface, the second surface being arranged to align with the first surface of the first member, wherein a welding portion of the first surface of the first member and a welding portion of the second surface of the second member form a welded surface, and wherein the second member has a recess part on the third surface, and a part of a peripheral side surface of the recess part is formed by the second surface.

2. A case comprising:

a first member having a first surface; and a second member having a second surface and a third surface inclined at a prescribed angle to the second surface, the second surface being arranged to align with the first surface of the first member, wherein a welding portion of the first surface of the first member and a welding portion of the second surface of the second member form a welded surface, and wherein the second member has a regulating part which regulates spreading of melted material on the third surface, and a part of the regulating part is formed by the second surface.

3. The case according to claim 1, wherein the first member is a case body, and the second member is an exterior member.

4. The case according to claim 1, wherein laser light is irradiated onto the welding surface, and the recess part is located at a position where reflected light reflected on the welding surface is irradiated.

5. The case according to claim 1, wherein a contact surface of the first member and the second member includes a first abutting surface parallel with a thickness direction of the first member and a second abutting surface perpendicular to the thickness direction of the first member.

6. The case according to claim 2, wherein a contact surface of the first member and the second member includes a first abutting surface parallel with a thickness direction of the first member and a second abutting surface perpendicular to the thickness direction of the first member.

7. The case according to claim 3, wherein a contact surface of the first member and the second member includes a first abutting surface parallel with a thickness direction of the first member and a second abutting surface perpendicular to the thickness direction of the first member.

8. The case according to claim 4, wherein a contact surface of the first member and the second member includes a first abutting surface parallel with a thickness direction of the first member and a second abutting surface perpendicular to the thickness direction of the first member.

9. The case according to claim 1, wherein in the welding portion, the second member protrudes inward from the first member.

10. The case according to claim 2, wherein in the welding portion, the second member protrudes inward from the first member.

11. A timepiece comprising:

the case according to claim 1;

a module that is stored inside the case; and a module receiving surface which receives a module.

12. A timepiece comprising:

the case according to claim 2;

a module that is stored inside the case; and a module receiving surface which receives a module.

13. A method of manufacturing a case comprising:

irradiating laser light toward a welding part of a main case body and an exterior member, a reflected light reflected on an irradiated surface where the welding part is located being irradiated toward a concave-shaped reflected-light receiving part formed in the exterior member at an angle corresponding to an incident angle of the laser light; and welding the welding part of the main case body and the exterior member.

14. A method of manufacturing a timepiece that includes the method of manufacturing the case according to claim 13, wherein when joining the main case body and the exterior member, the method of manufacturing the timepiece includes:

a first step of disposing the exterior member on an upper side of the main case body with a first waterproof ring interposed therebetween;

a second step of welding the welding part from a rear side of the main case body with the laser light;

a third step of disposing a module from the rear side of the main case body; and a fourth step of attaching a back lid member to an opening part of the rear side of the main case body with a second waterproof ring interposed therebetween.

15. The method according to claim 14, wherein in the first step, an upper surface of an inner periphery side of the main case body is brought into contact with a lower end surface of the exterior member.

16. The method according to claim 14, wherein the second step includes a step of irradiating the laser light from a vicinity of a center part of the rear side of the main case body toward the welding part to weld the main case body and the exterior member, and the method comprises a step of irradiating the reflected light reflected on the irradiated surface of the welding part toward the reflected-light receiving part at the angle corresponding to the incident angle of the laser light to melt an inside of the reflected-light receiving part between the second step and the first step.

17. The method according to claim 15, wherein the second step includes a step of irradiating the laser light from a vicinity of a center part of the rear side of the main case body toward the welding part to weld the main case body and the exterior member, and the method comprises a step of irradiating the reflected light reflected on the irradiated surface of the welding part toward the reflected-light receiving part at the angle corresponding to the incident angle of the laser light to melt an inside of the reflected-light receiving part between the second step and the first step.

18. The method according to claim 14, wherein the third step includes a step of bringing an upper side of the module into contact with a module receiving surface of the exterior member.

19. The method according to claim 14, wherein the method comprises a step of attaching a windshield member to an opening part of a front side of the main case body with a third waterproof ring interposed therebetween to block the opening part after the fourth step.

20. A case comprising:

a first member; and a second member, wherein the second member has a recess part on a surface that intersects with a welding surface where a welding part of the first member and the second member is located, wherein laser light is irradiated onto the welding part of the first member and the second member, and wherein the recess part is located at a position where reflected light reflected on the welding surface is irradiated.

21. A case comprising:

a first member; and a second member, wherein the second member has a recess part on a surface that intersects with a welding surface where a welding part of the first member and the second member is located, and wherein a contact surface of the first member and the second member includes a first abutting surface parallel with a thickness direction of the first member and a second abutting surface perpendicular to the thickness direction of the first member.

22. A case comprising:

a first member; and a second member, wherein the second member has a recess part on a surface that intersects with a welding surface where a welding part of the first member and the second member is located, and wherein a contact surface of the first member and the second member includes a first abutting surface parallel with a thickness direction of the first member and a second abutting surface perpendicular to the thickness direction of the first member.

* * * * *